United States Patent
Sippel et al.

(10) Patent No.: US 10,443,409 B2
(45) Date of Patent: Oct. 15, 2019

(54) TURBINE BLADE WITH CERAMIC MATRIX COMPOSITE MATERIAL CONSTRUCTION

(71) Applicants: Rolls-Royce Corporation, Indianapolis, IN (US); Rolls-Royce North American Technologies, Inc., Indianapolis, IN (US)

(72) Inventors: Aaron D. Sippel, Zionsville, IN (US); Daniel K. Vetters, Indianapolis, IN (US); Ted J. Freeman, Danville, IN (US); David J. Thomas, Brownsburg, IN (US)

(73) Assignees: Rolls-Royce North American Technologies Inc., Indianapolis, IN (US); Rolls-Royce Corporation, Indianapolis, IN (US)

( * ) Notice: Subject to any disclaimer, the term of this patent is extended or adjusted under 35 U.S.C. 154(b) by 702 days.

(21) Appl. No.: 15/337,544

(22) Filed: Oct. 28, 2016

(65) Prior Publication Data
US 2018/0230823 A1    Aug. 16, 2018

(51) Int. Cl.
*F01D 5/28* (2006.01)
*F01D 5/14* (2006.01)
(Continued)

(52) U.S. Cl.
CPC ............ *F01D 5/282* (2013.01); *C04B 35/565* (2013.01); *F01D 5/147* (2013.01); *F01D 5/284* (2013.01);
(Continued)

(58) Field of Classification Search
CPC ........ F01D 5/282; F01D 5/284; F01D 5/3084; F01D 5/3007; F01D 5/147
See application file for complete search history.

(56) References Cited

U.S. PATENT DOCUMENTS 4,113,910 A * 9/1978 Loyd ..................... B29C 66/112
                                                                428/162
4,343,593 A * 8/1982 Harris ..................... F01D 5/282
                                                                416/193 A
(Continued)

FOREIGN PATENT DOCUMENTS

EP      1801354 A2    6/2007
FR      2440831 A1    6/1980
(Continued)

OTHER PUBLICATIONS

Extended European Search Report dated Jan. 30, 2018 and issued in connection with EP patent Applicantion No. 17196278.0.

*Primary Examiner* — Justin D Seabe
*Assistant Examiner* — Behnoush Haghighian
(74) *Attorney, Agent, or Firm* — Barnes & Thornburg LLP

(57) ABSTRACT

A turbine blade of ceramic matrix composite material construction adapted for use in a gas turbine engine is disclosed. The turbine blade includes a root, an airfoil, and a platform. The root is adapted to attach the turbine blade to a disk. The airfoil is shaped to interact with hot gasses moving through the gas path of a gas turbine engine and cause rotation of the turbine blade when the turbine blade is used in a gas turbine engine. The platform is arranged between the root and the airfoil and is shaped to block gasses from the gas path migrating toward the root when the turbine blade is used in a gas turbine engine.

20 Claims, 1 Drawing Sheet

(51) Int. Cl.
*F01D 5/30* (2006.01)
*C04B 35/565* (2006.01)

(52) U.S. Cl.
CPC ......... *F01D 5/3007* (2013.01); *F01D 5/3084* (2013.01); *C04B 2235/5244* (2013.01); *F05D 2230/23* (2013.01); *F05D 2230/60* (2013.01); *F05D 2240/80* (2013.01); *F05D 2300/2261* (2013.01); *F05D 2300/6033* (2013.01); *F05D 2300/6034* (2013.01); *Y02T 50/672* (2013.01); *Y02T 50/673* (2013.01)

(56) References Cited

U.S. PATENT DOCUMENTS

| | | | | |
|---|---|---|---|---|
| 4,559,005 A * | 12/1985 | Gants | ................... | B29C 70/504 425/363 |
| 4,966,527 A * | 10/1990 | Merz | ................... | B29C 70/202 416/230 |
| 4,992,317 A * | 2/1991 | Chess | ................... | B29C 70/543 428/102 |
| 5,672,417 A * | 9/1997 | Champenois | ........... | F01D 5/282 416/230 |
| 5,725,709 A | 3/1998 | Jensen | | |
| 5,789,061 A * | 8/1998 | Campbell | ............. | B29C 65/564 156/73.1 |
| 7,198,472 B2 * | 4/2007 | McMillan | ................ | F01D 5/147 29/889.23 |
| 7,510,379 B2 * | 3/2009 | Marusko | ................ | F01D 5/282 29/889.7 |
| 7,549,840 B2 * | 6/2009 | Subramanian | ........ | C04B 35/573 29/889.2 |
| 8,100,662 B2 * | 1/2012 | Schreiber | .............. | B29C 70/202 416/230 |
| 8,475,895 B2 * | 7/2013 | Xie | ....................... | F01D 25/005 415/170.1 |
| 8,715,809 B2 | 5/2014 | Ravey | | |
| 8,734,605 B2 * | 5/2014 | Harrison | ............... | B29C 66/126 156/242 |
| 8,794,925 B2 * | 8/2014 | McCaffrey | .............. | F01D 5/282 416/219 R |
| 9,212,560 B2 * | 12/2015 | McCaffrey | .............. | F01D 5/147 |
| 9,249,684 B2 * | 2/2016 | Lazur | .................... | F01D 25/005 |
| 9,435,209 B2 * | 9/2016 | Garcia Crespo | ........ | F01D 5/147 |
| 9,598,967 B2 * | 3/2017 | Xu | ............................ | F01D 5/30 |
| 9,611,746 B2 * | 4/2017 | Luczak | .................... | F01D 5/26 |
| 9,845,688 B2 * | 12/2017 | Thomas | .................. | F01D 5/147 |
| 9,963,979 B2 * | 5/2018 | Freeman | ................. | F01D 5/284 |
| 10,046,482 B2 * | 8/2018 | Marsal | ............... | B29D 99/0025 |
| 2005/0158171 A1 * | 7/2005 | Carper | .................... | B32B 18/00 415/200 |
| 2011/0217166 A1 * | 9/2011 | McMillan | ................ | F01D 5/147 415/229 |
| 2012/0230829 A1 * | 9/2012 | Benkler | .................. | F01D 5/282 416/219 R |
| 2013/0011271 A1 * | 1/2013 | Shi | ........................... | F01D 5/28 416/230 |
| 2013/0064668 A1 * | 3/2013 | Paige, II | ................. | F01D 5/284 416/219 R |
| 2014/0271208 A1 * | 9/2014 | Garcia-Crespo | .......... | F01D 5/30 416/194 |
| 2014/0349538 A1 * | 11/2014 | Marchal | .................. | B29C 70/24 442/206 |
| 2015/0050158 A1 * | 2/2015 | Thomas | ............... | B23K 1/0018 416/241 R |
| 2015/0192027 A1 * | 7/2015 | Paige | ..................... | F01D 5/282 416/174 |
| 2016/0146021 A1 * | 5/2016 | Freeman | ................. | F01D 5/284 416/95 |
| 2016/0222800 A1 * | 8/2016 | Kleinow | ................... | F01D 5/22 |
| 2016/0230568 A1 * | 8/2016 | Sippel | ..................... | F01D 9/041 |
| 2016/0245100 A1 * | 8/2016 | Luczak | .................... | F01D 5/32 |
| 2016/0245103 A1 * | 8/2016 | Gimat | .................... | B29B 11/16 |
| 2017/0058912 A1 * | 3/2017 | De Gaillard | ............ | B29B 11/16 |

FOREIGN PATENT DOCUMENTS

GB 1238810 A 7/1971
JP 7156888 A 6/1995

\* cited by examiner

TURBINE BLADE WITH CERAMIC MATRIX COMPOSITE MATERIAL CONSTRUCTION

FIELD OF THE DISCLOSURE

The present disclosure relates generally to turbine blades, and more specifically to turbine blades with composite material construction.

BACKGROUND

Gas turbine engines are used to power aircraft, watercraft, power generators, and the like. Gas turbine engines typically include a compressor, a combustor, and a turbine. The compressor compresses air drawn into the engine and delivers high pressure air to the combustor. In the combustor, fuel is mixed with the high pressure air and is ignited. Products of the combustion reaction in the combustor are directed into the turbine where work is extracted to drive the compressor and, sometimes, an output shaft. Left-over products of the combustion are exhausted out of the turbine and may provide thrust in some applications.

Blades of the turbine capture energy from the products of the combustor as they expand causing rotation of the turbine. The interaction of combustion products with the blades heats the blades. The blades are often made from high-temperature compatible materials and are sometimes actively cooled by supplying air to the blades. To this end, some blades incorporate composite materials to withstand very high temperatures. Design and manufacture of blades from composite materials presents challenges.

SUMMARY

The present disclosure may comprise one or more of the following features and combinations thereof.

A turbine blade of ceramic matrix composite material construction and adapted for use in the gas turbine engine is disclosed in this paper. The turbine blade may include a root, an airfoil, and a platform. The root may be adapted to attach the turbine blade to a disk. The airfoil may be shaped to interact with hot gasses moving through the gas path of a gas turbine engine and cause rotation of the turbine blade when the turbine blade is used in a gas turbine engine. The platform may have an attachment side facing the root and a gas path side facing the airfoil. The platform may be arranged between the root and the airfoil and may be shaped to extend outwardly from the root and the airfoil in order to block gasses from the gas path migrating toward the root when the turbine blade is used in a gas turbine engine.

In some embodiments, the turbine blade may include core fiber-reinforcement plies that form part of the root and the airfoil without forming part of the platform, at least one gas path fiber-reinforcement ply that forms part of the airfoil and the platform, and attachment fiber-reinforcement plies that form part of the root and the platform. In some embodiments, the number of attachment fiber-reinforcement plies may be greater than the number of gas path fiber-reinforcement plies so that radial forces induced on the platform when the turbine blade is used in a gas turbine engine are largely transferred to the root without having to pass between fiber-reinforcement plies of the turbine blade.

In some embodiments, at least one of the attachment fiber-reinforcement plies may be located at the attachment side of the platform and at least one of the attachment fiber-reinforcement plies is located between the attachment side and the gas path side of the platform. In some embodiments, the at least one gas path fiber-reinforcement ply may be located at the gas path side of the platform.

In some embodiments, the turbine blade may have a plurality of platform fiber-reinforcement plies that form part of the platform without forming part of the root or the airfoil. In some embodiments, at least one of the platform fiber-reinforcement plies may be arranged between the at least one gas path fiber-reinforcement ply and one of the attachment fiber-reinforcement plies.

In some embodiments, a plurality of filler reinforcement fibers may be arranged to fill a space formed between one of the attachment reinforcement-fiber plies and one of the platform fiber-reinforcement plies. In some embodiments, an external one of the attachment fiber-reinforcement plies may be located at the attachment side of the platform and the plurality of filler reinforcement fibers are spaced apart from the external one of the attachment fiber-reinforcement plies by at least one internal one of the attachment fiber-reinforcement plies.

In some embodiments, an external one of the at least one gas path fiber-reinforcement plies may provide an outer surface of the airfoil and the gas path side of the platform. In some embodiments, the at least one gas path fiber-reinforcement plies may include only one fiber-reinforcement ply.

In some embodiments, the turbine blade may include a plurality of platform fiber-reinforcement plies that form part of the platform without forming part of the root or the airfoil, wherein a plurality of transition reinforcement fibers are arranged to fill a space between the external one of the at least one gas path fiber-reinforcement plies and one of the platform fiber-reinforcement plies. In some embodiments, a plurality of filler reinforcement fibers may be arranged to fill a space formed between one of the attachment reinforcement-fiber plies and one of the platform fiber-reinforcement plies.

According to another aspect of the present disclosure, a turbine blade may include a root, an airfoil, and a platform. The root may be adapted to attach the turbine blade to a disk. The airfoil may be aerodynamically shaped to interact with gasses. The platform may have an attachment side facing the root and a gas path side facing the airfoil, the platform arranged between the root and the airfoil and shaped to extend outwardly from the root and the airfoil.

In some embodiments, the turbine blade may include at least one gas path fiber-reinforcement ply that forms part of the airfoil and the platform and attachment fiber-reinforcement plies that form part of the root and the platform. In some embodiments, the at least one gas path fiber-reinforcement ply and the attachment fiber-reinforcement plies may comprise ceramic-containing materials, wherein the at least one gas path fiber-reinforcement ply and the attachment fiber-reinforcement plies may be bonded by ceramic-containing matrix material. In some embodiments, the number attachment fiber-reinforcement plies may be greater than the number of gas path fiber-reinforcement plies.

In some embodiments, the turbine blade may comprise core fiber-reinforcement plies that form part of the root and part of the airfoil. In some embodiments, at least one of the attachment fiber-reinforcement plies may be located at the attachment side of the platform and at least one of the attachment fiber-reinforcement plies is spaced apart from the attachment side of the platform by at least one other fiber-reinforcement ply.

In some embodiments, the at least one gas path fiber-reinforcement ply may be located at the gas path side of the platform. In some embodiments, the turbine blade may comprise a plurality of platform fiber-reinforcement plies that form part of the platform without forming part of the root or the airfoil.

In some embodiments, an external one of the at least one gas path fiber-reinforcement plies may provide an outer surface of the airfoil and the gas path side of the platform. In some embodiments, the at least one gas path fiber-reinforcement plies may include only one fiber-reinforcement ply.

In some embodiments, the turbine blade may comprise a plurality of platform fiber-reinforcement plies that form part of the platform without forming part of the root or the airfoil, wherein a plurality of transition reinforcement fibers are arranged to fill a space between the external one of the at least one gas path fiber-reinforcement plies and one of the platform fiber-reinforcement plies. In some embodiments, a plurality of filler reinforcement fibers may be arranged to fill a space formed between one of the attachment reinforcement-fiber plies and one of the platform fiber-reinforcement plies.

These and other features of the present disclosure will become more apparent from the following description of the illustrative embodiments.

DETAILED DESCRIPTION OF THE DRAWINGS

Figure 1:
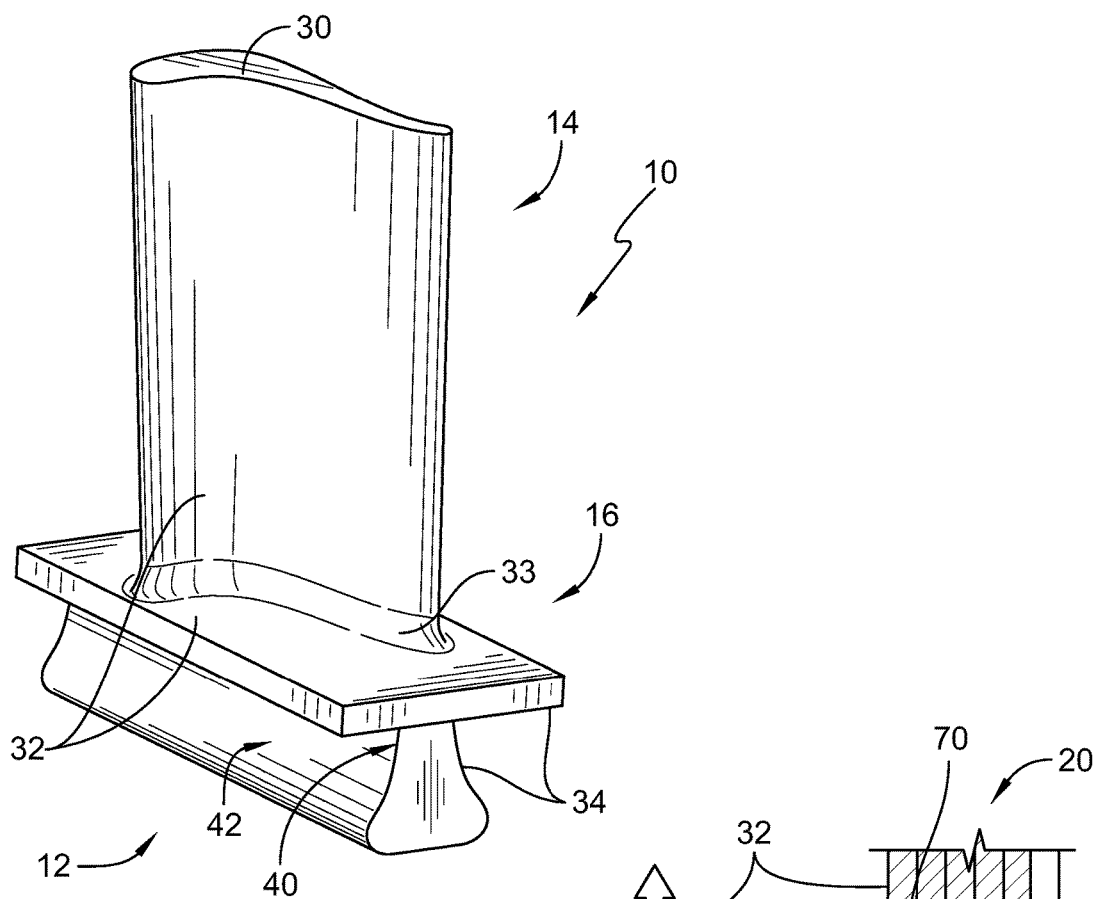
FIG. 1 is a perspective view of a turbine blade of ceramic matrix composite material construction, the turbine blade including a root adapted to attach the turbine blade to a disk, an airfoil shaped to interact with hot gasses in a turbine engine flow path, and a platform that separates the root from the airfoil such that hot gasses from the turbine engine flow path are blocked from the attachment of the root to the disk.

For the purposes of promoting an understanding of the principles of the disclosure, reference will now be made to a number of illustrative embodiments illustrated in the drawings and specific language will be used to describe the same.

The present disclosure includes a turbine blade 10 adapted for use in a gas turbine engine as shown in FIG. 1. Turbine blade 10 is constructed of a ceramic matrix composite material and includes a root 12, an airfoil 14, and a platform 16 as shown in FIG. 1. Root 12 is adapted to attach turbine blade 10 to a disk within the gas turbine engine. Airfoil 14 extends away from root 12 and platform 16 and is shaped to interact with hot gasses moving through the gas path of the gas turbine engine. Interaction of the airfoil 14 with the hot gasses causes rotation of turbine blade 10 about a central axis when turbine blade 10 is used in a gas turbine engine. Platform 16 divides root 12 from airfoil 14. Platform 16 extends outwardly from root 12 and airfoil 14 in order to block gasses from the gas path migrating toward root 12 when turbine blade 10 is used in a gas turbine engine.

In the illustrative embodiment, the ceramic matrix composite material (CMC) used to make turbine blade 10 comprises silicon-carbide fibers in a silicon-carbide matrix. However, it is contemplated that turbine blade 10 may be constructed of other suitable composite materials depending on application. Designs in accordance with the present disclosure incorporate attachment plies 24 that provide portions of both the platform 16 and the root 14 so that the platform 16 is directly tied into the root 14. By using common attachment plies 24, forces applied to the platform 16 is directly transferred to the root 14 without passing from ply to ply across interfaces that may not be as strong as the plies themselves.

Root 12 extends downward from platform 16 and flares outward to form a dovetail shape that can anchor turbine blade 10 into a turbine disk included in the gas turbine engine as suggested in FIG. 1. However, it is within the scope of this disclosure to use any suitable root shape such as c-shaped attachments, fir tree shapes, or the like. Root 12 includes a shank section 40 and an attachment section 42. Shank section 40 is coupled to platform 16 and extends downward from platform 16. Attachment section extends downward from shank section 42 and flares outward to define the dovetail shape of root 12.

Airfoil 14 extends outward from platform 16 and is formed with a curvature suitable to engage the gas flow produced by the gas turbine engine as shown in FIG. 1. Airfoil 14 is integrally formed with root 12 and platform 16 so that platform 16 extends outward in a substantially perpendicular direction from root 12 and airfoil 14.

Platform 16 extends outward from root 12 and airfoil 14 and includes a gas path surface 32 and an attachment surface 34 as shown in FIG. 1. Platform 16 forms a boundary between hot gasses in the gas path (bounded by gas path surface 32), and cooler components located below platform 16 (bounded by attachment surface 34). Platform 16 maintains the survivability of the components below attachment surface 32 by blocking the migration of gases from the gas path. Platform 16 is made integral to root 12 and airfoil 14 to minimize the migration of gases between the gas path and the cooler components below platform 16.

Figure 2:
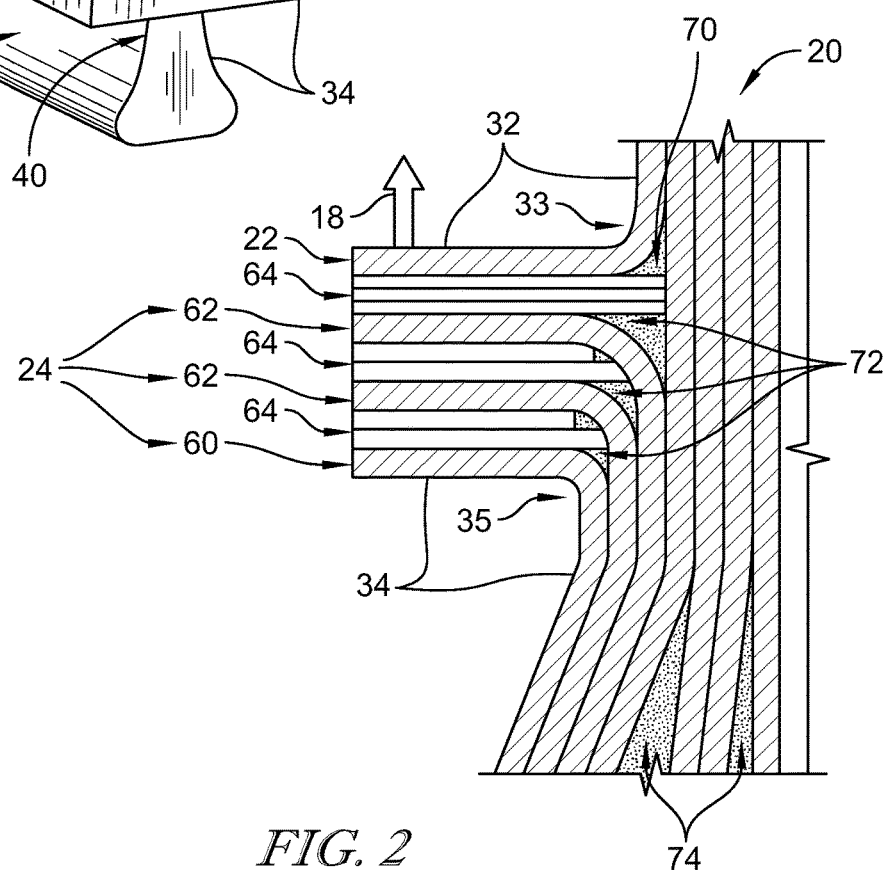
FIG. 2 is a partial cross-sectional view of the turbine blade of FIG. 1 showing that the root, the airfoil, and the platform are made up of a number of ceramic-containing reinforcement plies bonded together by a ceramic-containing matrix material to provide a ceramic matrix composite component.

Root 12, airfoil 14 and platform 16 are integrally formed using core fiber-reinforcement plies 20, a gas path fiber-reinforcement ply 22, and attachment fiber-reinforcement plies 24 that are co-processed in matrix material as shown in FIG. 2. Core fiber-reinforcement plies 20 are disposed centrally within turbine blade 10 to provide a body 30 of turbine blade 10. Gas path fiber-reinforcement ply 22 forms gas path surface 32 along airfoil 14 and platform 16. Attachment fiber-reinforcement plies 24 are intertwined within root 12 and platform 16 and extend from root 12 into platform 16.

Core fiber-reinforcement plies 20 are arranged internal to turbine blade 10 and extend from root 12, past platform 16, and through airfoil 14 as shown in FIG. 2. Core fiber-reinforcement plies 20 are configured to define the curvature of airfoil 14 and provide central support for turbine blade 10 while the gas turbine engine is in operation. Core fiber-reinforcement plies form part of root 12 and airfoil 14 without forming part of platform 16. In the illustrative embodiment, core fiber-reinforcement plies 20 are made from two-dimensional woven fabrics but may be made from other suitable sheets of reinforcement.

At least one gas path fiber-reinforcement ply 22 is coupled to platform 16 and forms gas path surface 32 of platform 16. Illustratively, gas path fiber-reinforcement ply 22 forms gas path surface 32 of airfoil 14 and platform 16 along with a blade transitional bend 33 defined between airfoil 14 and platform 16.

Attachment fiber-reinforcement plies 24 integrate root 12 with platform 16 and include an attachment surface ply 60 and internal attachment plies 62 as shown in FIG. 2. Attachment surface ply 60 and internal attachment plies 62 extend from root 12 and integrate into platform 16. Attachment surface ply 60 forms attachment surface 34 along with an attachment transitional bend 35 defined between root 12 and platform 16. Internal attachment plies 62 extend from root 12, around attachment transitional bend 35, and integrate into platform 16 at locations between attachment surface ply 60 and gas path fiber-reinforcement ply 22. In the illustrative embodiment, two internal attachment plies 62 are used, however, it is contemplated that any suitable number of internal attachment plies 62 may be used.

A major load acting outwardly on platform 16 during operation of the gas turbine engine is a radial centrifugal force 18 formed as a result of the hot gases interacting with airfoil 14 causing the rotation of turbine blade 10. Radial centrifugal force 18 can create high stresses in attachment transitional bend 35 between root 12 and platform 16 as the rotation of turbine blade 10 causes these areas to bend. To compensate for radial centrifugal force 18, core plies 20, gas path fiber-reinforcement ply 22, and attachment fiber-reinforcement plies 24 are placed and oriented selectively within turbine blade 10 so that radial forces induced on the platform when turbine blade 10 is used in a gas turbine engine are largely transferred to root 12 without causing interlaminar transfer of shear forces between the fiber-reinforcement plies of turbine blade 10.

The number attachment fiber-reinforcement plies 24 is greater than the number of gas path fiber-reinforcement plies 22 to compensate for radial centrifugal force 18 by providing a direct load path from platform 16 to root 12 as shown in FIG. 2. The greater number of attachment fiber-reinforcement plies 24 are provided using additional internal attachment plies 62 that extend from root 12 and are integrated within platform 16. The additional internal attachment plies 62 extending from root 12 to platform 16 resist the stresses formed in attachment transitional bend 35 by reinforcing transitional bend 35. Additional internal-attachment plies 62 block interlaminar transfer of shear forces between CMC plies within turbine blade 10 by providing a direct load path from platform 16 to root 12. By minimizing shear forces between plies, the life of turbine blade 10 is increased.

Platform 16 further includes platform fiber-reinforcement plies 64 that extend outwardly from root 12 and airfoil 14 with platform 16 as shown in FIG. 2. Platform fiber-reinforcement plies 64 are arranged between gas path fiber-reinforcement ply 22 and attachment surface ply 60. Platform fiber-reinforcement plies 64 are intertwined between internal-attachment plies 62. Platform fiber-reinforcement plies 64 do not form any part of root 12 or airfoil 14.

Turbine blade 10 further includes fill regions with transition reinforcement fibers 70, filler reinforcement fibers 72, and root reinforcement fibers 74 as shown in FIG. 2. Transition reinforcement fibers 70 are arranged to fill a space between gas path fiber-reinforcement ply 22 and one of the platform fiber-reinforcement plies 64. Filler reinforcement fibers 72 are arranged to fill a space formed between one of the attachment reinforcement-fiber plies 24 and one of the platform fiber-reinforcement plies 64. Root reinforcement fibers 74 are arranged to fill a space formed between one of the attachment fiber-reinforcement plies 24 and one of the core fiber-reinforcement plies 20. Root reinforcement fibers 74 may also fill spaces between core fiber-reinforcement plies 20 to form flared section 42 of root 12.

Reinforcement fibers 70, 72, 74 may be individual fiber tows placed in a predetermined orientation, loose fibers, multiple tows grouped through twisting or other means, and/or interleaved individual plies made up of fibers. The reinforcement fibers 70, 72, 74 may be processed in matrix material to form a composite. In other embodiments, only matrix material may be used in the fill regions.

According to the present disclosure, the platform on a turbine blade may define the inner annulus of the hot gas flow path. In doing so, it may shield components (turbine disk, shaft, etc.) below it from the high flow path temperatures. These components may be bathed in cooling air at a lower temperature and higher pressure than the flow path gases for their survivability. A primary function of the platforms may be to minimize the leakage of the higher pressure cooling air into the flow path in order to help maximize engine efficiency. To carry out this function, platforms may extend circumferentially and axially from the airfoil and stalk of the blade.

According to the present disclosure, the platforms may be made integral to the rest of the blade to eliminate leak paths. Manufacturing the platform as an integral feature can be a challenge for composite components as the major load acting on the blade is the radial centrifugal force. Composites may want to align the primary load carrying constituent, the fibers, with the loading direction. The platform is a feature which may require the fiber directions to be oriented 90 degrees to the radial direction.

The platform may carry the centrifugal force on the platform itself as well as the delta P, both of which are radially outward forces. FIG. 2 may show how a direct load path can be created from the platform to the attachment. Core fiber-reinforcement plies, gas path fiber-reinforcement plies, and attachment fiber-reinforcement plies may tie into the airfoil or the root from the platform. The platform fiber-reinforcement plies add thickness to the platform and reduce the size of the filler regions but do not directly tie into the airfoil or root.

The cross sectional area of the airfoil may be smaller than the cross sectional area of the root. The number of plies that can fit in the airfoil is less than that of the root. Directing attachment fiber-reinforcement plies to the root may allow more core fiber-reinforcement plies to stretch from the root through to the tip of the airfoil. This may be preferred in terms of keeping the core fiber-reinforcement plies primarily oriented radially as well as creating a direct load path from the airfoil to the root. This also may enable a thicker stalk region of the root to reduce stresses in the attachment transitional bend region.

Turbine blade designs according to the present disclosure may rely less on interlaminar material capability, which is usually much less than the in-plane capability, to carry the platform loads. With a sublaminate architecture that ties the platform directly into the root, a larger root may result where there may be more space for material.

During use, the radial loads of the platform may act to bend the platform up, resulting in a tensile stress concentration in the underside fillet and a compressive tensile stress concentration in the outer surface fillet. Because of this, it may be a significant advantage to have the majority of the plies traversing from the platform towards the attachment. This may result in the highest strength fillet on the underside, where the highest tensile stress concentration is located. Therefore, designs in accordance with this disclosure may provide a significant strength and/or life benefit for the turbine blade.

According to the present disclosure, the platform plies that are tied into the root are biased to the radial outward face of the platform. The number of plies from the airfoil and in the platform can vary. The number of platform fiber-reinforcement plies may vary and their spacing may be optimized for structural capability and reducing the size of the filler regions.

While the disclosure has been illustrated and described in detail in the foregoing drawings and description, the same is to be considered as exemplary and not restrictive in character, it being understood that only illustrative embodiments thereof have been shown and described and that all changes and modifications that come within the spirit of the disclosure are desired to be protected.

What is claimed is:

1. A turbine blade of ceramic matrix composite material construction adapted for use in a gas turbine engine, the turbine blade comprising:
   a root adapted to attach the turbine blade to a disk,
   an airfoil shaped to interact with hot gasses moving through a gas path of the gas turbine engine and cause rotation of the turbine blade when the turbine blade is used in the gas turbine engine, and
   a platform having an attachment side facing the root and a gas path side facing the airfoil, the platform arranged between the root and the airfoil and shaped to extend outwardly from the root and the airfoil in order to block gasses from the gas path migrating toward the root when the turbine blade is used in the gas turbine engine,
   wherein the turbine blade includes core fiber-reinforcement plies that form part of the root and the airfoil without forming part of the platform, at least one gas path fiber-reinforcement ply that forms part of the airfoil and the platform, and attachment fiber-reinforcement plies that form part of the root and the platform, and wherein the number of attachment fiber-reinforcement plies is greater than the number of gas path fiber-reinforcement plies so that radial forces induced on the platform when the turbine blade is used in the gas turbine engine are transferred to the root without having to pass between fiber-reinforcement plies of the turbine blade.

2. The turbine blade of claim 1, wherein at least one of the attachment fiber-reinforcement plies is located at the attachment side of the platform and at least one of the attachment fiber-reinforcement plies is located between the attachment side and the gas path side of the platform.

3. The turbine blade of claim 2, wherein the at least one gas path fiber-reinforcement ply is located at the gas path side of the platform.

4. The turbine blade of claim 1, further comprising a plurality of platform fiber-reinforcement plies that form part of the platform without forming part of the root or the airfoil.

5. The turbine blade of claim 4, wherein at least one of the platform fiber-reinforcement plies is arranged between the at least one gas path fiber-reinforcement ply and one of the attachment fiber-reinforcement plies.

6. The turbine blade of claim 4, wherein a plurality of filler reinforcement fibers are arranged to fill a space formed between one of the attachment reinforcement-fiber plies and one of the platform fiber-reinforcement plies.

7. The turbine blade of claim 6, wherein an external one of the attachment fiber-reinforcement plies is located at the attachment side of the platform and the plurality of filler reinforcement fibers are spaced apart from the external one of the attachment fiber-reinforcement plies by at least one internal one of the attachment fiber-reinforcement plies.

8. The turbine blade of claim 1, wherein an external one of the at least one gas path fiber-reinforcement plies provides an outer surface of the airfoil and the gas path side of the platform.

9. The turbine blade of claim 8, wherein the at least one gas path fiber-reinforcement plies includes only one fiber-reinforcement ply.

10. The turbine blade of claim 8, further comprising a plurality of platform fiber-reinforcement plies that form part of the platform without forming part of the root or the airfoil, wherein a plurality of transition reinforcement fibers are arranged to fill a space between the external one of the at least one gas path fiber-reinforcement plies and one of the platform fiber-reinforcement plies.

11. The turbine blade of claim 10, wherein a plurality of filler reinforcement fibers are arranged to fill a space formed between one of the attachment reinforcement-fiber plies and one of the platform fiber-reinforcement plies.

12. A turbine blade comprising
   a root adapted to attach the turbine blade to a disk,
   an airfoil aerodynamically shaped to interact with gasses, and
   a platform having an attachment side facing the root and a gas path side facing the airfoil, the platform arranged between the root and the airfoil and shaped to extend outwardly from the root and the airfoil,
   wherein the turbine blade includes at least one gas path fiber-reinforcement ply that forms part of the airfoil and the platform and attachment fiber-reinforcement plies that form part of the root and the platform, wherein the at least one gas path fiber-reinforcement ply and the attachment fiber-reinforcement plies comprise ceramic-containing materials, wherein the at least one gas path fiber-reinforcement ply and the attachment fiber-reinforcement plies are bonded by ceramic-containing matrix material, and wherein the number attachment fiber-reinforcement plies is greater than the number of gas path fiber-reinforcement plies.

13. The turbine blade of claim 12, wherein the turbine blade comprising core fiber-reinforcement plies that form part of the root and part of the airfoil.

14. The turbine blade of claim 12, wherein at least one of the attachment fiber-reinforcement plies is located at the attachment side of the platform and at least one of the attachment fiber-reinforcement plies is spaced apart from the attachment side of the platform by at least one other fiber-reinforcement ply.

15. The turbine blade of claim 14, wherein the at least one gas path fiber-reinforcement ply is located at the gas path side of the platform.

16. The turbine blade of claim 15, further comprising a plurality of platform fiber-reinforcement plies that form part of the platform without forming part of the root or the airfoil.

17. The turbine blade of claim 12, wherein an external one of the at least one gas path fiber-reinforcement plies provides an outer surface of the airfoil and the gas path side of the platform.

18. The turbine blade of claim 17, wherein the at least one gas path fiber-reinforcement plies includes only one fiber-reinforcement ply.

19. The turbine blade of claim 17, further comprising a plurality of platform fiber-reinforcement plies that form part of the platform without forming part of the root or the airfoil, wherein a plurality of transition reinforcement fibers are arranged to fill a space between the external one of the at least one gas path fiber-reinforcement plies and one of the platform fiber-reinforcement plies.

20. The turbine blade of claim 19, wherein a plurality of filler reinforcement fibers are arranged to fill a space formed between one of the attachment reinforcement-fiber plies and one of the platform fiber-reinforcement plies.

\* \* \* \* \*